United States Patent
Hou et al.

(10) Patent No.: US 10,650,764 B2
(45) Date of Patent: May 12, 2020

(54) COMMON VOLTAGE COMPENSATION UNIT AND COMPENSATION METHOD, DRIVING CIRCUIT AND DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Tao Hou, Beijing (CN); Junping Bao, Beijing (CN); Yuansen Huang, Beijing (CN); Mingzhou Guo, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 21 days.

(21) Appl. No.: 16/032,780

(22) Filed: Jul. 11, 2018

(65) Prior Publication Data
US 2019/0114979 A1    Apr. 18, 2019

(30) Foreign Application Priority Data
Oct. 18, 2017   (CN) .......................... 2017 1 0971848

(51) Int. Cl.
*G09G 3/36* (2006.01)
*G02F 1/1343* (2006.01)
(Continued)

(52) U.S. Cl.
CPC ......... *G09G 3/3648* (2013.01); *G02F 1/1343* (2013.01); *G02F 1/13306* (2013.01);
(Continued)

(58) Field of Classification Search
CPC .............. G02F 1/13306; G02F 1/1343; G02F 2201/121; G09G 2310/0264; G09G 3/20; G09G 3/3648
See application file for complete search history.

(56) References Cited

U.S. PATENT DOCUMENTS

| | | | | |
|---|---|---|---|---|
| 7,868,976 B2 * | 1/2011 | Lin | ....................... | G09G 3/3648 345/80 |
| 2005/0088392 A1 * | 4/2005 | Kim | ..................... | G09G 3/3655 345/94 |

(Continued)

FOREIGN PATENT DOCUMENTS

| CN | 1804710 A | 7/2006 |
|---|---|---|
| CN | 101071215 A | 11/2007 |

(Continued)

OTHER PUBLICATIONS

Ma, Translation of CN101770750, Jan. 25, 2012 (Year: 2012).*
First Office Action for Chinese Patent Application No. 201710971848.2 dated Aug. 5, 2019.

*Primary Examiner* — Dmitriy Bolotin
(74) *Attorney, Agent, or Firm* — Calfee, Halter & Griswold LLP (57) ABSTRACT

A common voltage compensation unit and compensation method, a driving circuit and a display panel are disclosed. In the common voltage compensation unit provided by the disclosure, the first compensation module may be used for outputting a first common voltage to the common electrode line in the pixel charging period of time, and the second compensation module may be used for outputting a second common voltage to the common electrode line in the pixel non-charging period of time.

11 Claims, 4 Drawing Sheets

(51) Int. Cl.
*G02F 1/133* (2006.01)
*G09G 3/20* (2006.01)

(52) U.S. Cl.
CPC ......... *G09G 3/20* (2013.01); *G02F 2201/121* (2013.01); *G09G 2310/0264* (2013.01)

(56) References Cited

U.S. PATENT DOCUMENTS

| | | | |
|---|---|---|---|
| 2006/0208985 A1* | 9/2006 | Hwang | G09G 3/3655 345/92 |
| 2006/0284811 A1 | 12/2006 | Huang | |
| 2008/0231572 A1* | 9/2008 | Shie | G02F 1/134309 345/87 |
| 2008/0291144 A1 | 11/2008 | Chen | |
| 2008/0303763 A1* | 12/2008 | Lim | G09G 3/3655 345/87 |
| 2009/0015527 A1 | 1/2009 | Chung et al. | |
| 2009/0278776 A1* | 11/2009 | Pai | G09G 3/3614 345/87 |
| 2010/0245326 A1* | 9/2010 | Xiao | G09G 3/3655 345/211 |
| 2010/0321365 A1* | 12/2010 | Fanchiang | G09G 3/3655 345/211 |
| 2011/0273420 A1* | 11/2011 | Liu | G09G 3/3233 345/211 |
| 2013/0249882 A1 | 9/2013 | Lin et al. | |
| 2014/0104525 A1* | 4/2014 | Zhang | G02F 1/134363 349/41 |
| 2014/0252964 A1* | 9/2014 | Wu | H03K 19/0175 315/161 |
| 2016/0372025 A1* | 12/2016 | Ahn | G09G 3/3614 |

FOREIGN PATENT DOCUMENTS

| | | |
|---|---|---|
| CN | 101311781 A | 11/2008 |
| CN | 101770750 A | 7/2010 |
| CN | 101847376 A | 9/2010 |
| CN | 102608817 A | 7/2012 |

* cited by examiner (RELATED ART)

COMMON VOLTAGE COMPENSATION UNIT AND COMPENSATION METHOD, DRIVING CIRCUIT AND DISPLAY PANEL

CROSS-REFERENCE TO RELATED APPLICATIONS

This application claims the benefit of the Chinese patent application No. 201710971848.2 filed on Oct. 18, 2017, the entire disclosure of which is incorporated herein by reference.

TECHNICAL FIELD

The disclosure relates to the field of display technology, and in particular, to a common voltage compensation unit and compensation method, a driving circuit and a display panel.

BACKGROUND

Thin film transistor liquid crystal displays (TFT-LCDs for short) have the characteristics of small size, low power consumption, no radiation and so on, have been developed rapidly in recent years, and are dominant in the current flat panel display market. The major structure of a TFT-LCD is a liquid crystal display panel, the liquid crystal display panel includes an assembled thin film transistor array substrate and color film substrate, and liquid crystal molecules are filled between the array substrate and the color film substrate. The liquid crystal display panel achieves grayscale display by controlling the voltages of a display electrode and a common electrode to form an electric field that drives the deflection of liquid crystal molecules. Therein, the liquid crystal molecules need to be driven by an alternating current, and a DC voltage being applied to the liquid crystal molecules for a long time will affect the electrochemical characteristics of the liquid crystal molecules, resulting in a decrease in the lifespan of the liquid crystal display panel. Therefore, the driving voltage must be periodically reversed, that is, divided into positive polarity driving and negative polarity driving. Therein, the positive polarity driving refers to controlling the voltage of the display electrode to be higher than that of the common electrode. The negative polarity driving refers to controlling the voltage of the display electrode to be lower than that of the common electrode. For a liquid crystal molecule, whether positive polarity driving or negative polarity driving, the displayed gray level is the same, as long as the absolute value of its voltage difference is identical.

Therefore, when the absolute value of voltage difference is different under two driving voltages, the gray level displayed by the liquid crystal display panel will be different and make the display screen flicker.

SUMMARY

Embodiments of the disclosure provide a common voltage compensation unit and compensation method, a driving circuit and a display panel that address this problem.

In a first embodiment, there is provided a common voltage compensation unit for a scanning line, including a first compensation module, a second compensation module, the scanning line and a common electrode line corresponding to the scanning line one-to-one; the first compensation module and the second compensation module are connected in parallel between the common electrode line and the scanning line; the first compensation module is used for outputting a first common voltage to the common electrode line when the voltage on the scanning line is an ON voltage; and the second compensation module is used for outputting a second common voltage to the common electrode line when the voltage on the scanning line is an OFF voltage; wherein the first common voltage is greater than the second common voltage.

In a second embodiment, the disclosure further provides a driving circuit including at least one of any of the above common voltage compensation units; the driving circuit further includes a source driver chip; the source driver chip includes a first common voltage output terminal and a second common voltage output terminal; the first compensation module of each common voltage compensation unit is connected with the first common voltage output terminal to receive a first common voltage therefrom; and the second compensation module of each common voltage compensation unit is connected with the second common voltage output terminal to receive a second common voltage therefrom.

Further, the first compensation module includes a first input terminal and a first transistor; the gate of the first transistor is connected with the scanning line, a first pole of the first transistor is connected with the first input terminal, and a second pole of the first transistor is connected with the common electrode line; the first input terminal is used for inputting the first common voltage to the first compensation module; and the first transistor is used for conducting the first common voltage to the common electrode line when the voltage on the scanning line is the ON voltage.

Further, the second compensation module includes a second input terminal and a second transistor; the gate of the second transistor is connected with the scanning line, a first pole of the second transistor is connected with the second input terminal, and a second pole of the second transistor is connected with the common electrode line; the second input terminal is used for inputting the second common voltage to the second compensation module; and the second transistor is used for conducting the second common voltage to the common electrode line when the voltage on the scanning line is the OFF voltage.

Further, the first transistor is an N-type transistor, and the second transistor is a P-type transistor.

Further, the first compensation module, the second compensation module, the common electrode line and the scanning line are all formed on a thin film transistor array substrate.

Further, the first compensation module and the second compensation module are connected with the gate of a thin film transistor in a pixel area in the array substrate through the scanning line, wherein the pixel area includes a source drain metal layer which is used for forming the source and the drain of a thin film transistor in the pixel area and further for forming the first input terminal and the second input terminal.

In a third embodiment, the disclosure further provides a display panel including any of the above common voltage compensation units.

Further, each of all the effective scanning lines of the display panel corresponds to a corresponding common voltage compensation unit.

Further, the first compensation module includes a first input terminal and a first transistor; the gate of the first transistor is connected with the scanning line, a first pole of the first transistor is connected with the first input terminal, and a second pole of the first transistor is connected with the common electrode line; the first input terminal is used for inputting the first common voltage to the first compensation module; and the first transistor is used for conducting the first common voltage to the common electrode line when the voltage on the scanning line is an ON voltage; and the second compensation module includes a second input terminal and a second transistor; the gate of the second transistor is connected with the scanning line, a first pole of the second transistor is connected with the second input terminal, and a second pole of the second transistor is connected with the common electrode line; the second input terminal is used for inputting the second common voltage to the second compensation module; and the second transistor is used for conducting the second common voltage to the common electrode line when the voltage on the scanning line is an OFF voltage.

In a fourth embodiment, the disclosure further provides a common voltage compensation method for a circuit including a common electrode line and a scanning line; outputting a first common voltage to the common electrode line when the voltage on the scanning line is an ON voltage; and outputting a second common voltage to the common electrode line when the voltage on the scanning line is an OFF voltage, wherein the first common voltage is greater than the second common voltage.

DETAILED DESCRIPTION

To make that the objects, features and advantages of the disclosure can be clearer and easier to understand, the disclosure will be further described in detail in conjunction with the drawings and specific implementations.

In the description of the disclosure, unless otherwise stated, the orientation or position relationship indicated by the terms "above", "below", "inside", "outside", etc. is an orientation or position relationship based on what is shown in the drawings, it is only for the convenience of describing the disclosure and simplifying the description, but does not indicate or imply that the element referred to must have a specific orientation, and be constructed and operated in a specific orientation, and therefore cannot be understood as limiting the disclosure.

In the description of the disclosure, it needs to be noted that, unless definitely prescribed and defined otherwise, the term "connected" "connecting" should be understood in a broad sense, for example, it may be a fixed connection, or also may be a removable connection, or connected integrally; it may be a mechanical connection, or also may be an electrical connection; it may be connected directly, or also may be connected indirectly by an intermediate medium. For the person having ordinary skills in the art, the specific meaning of the above terms in the disclosure may be understood according to the specific circumstances.

In the following, specific implementations of the disclosure will be further described in detail in conjunction with the drawings and embodiments. The following embodiments are used for illustrating the disclosure, but not for limiting the scope of the disclosure.

Figure 1:
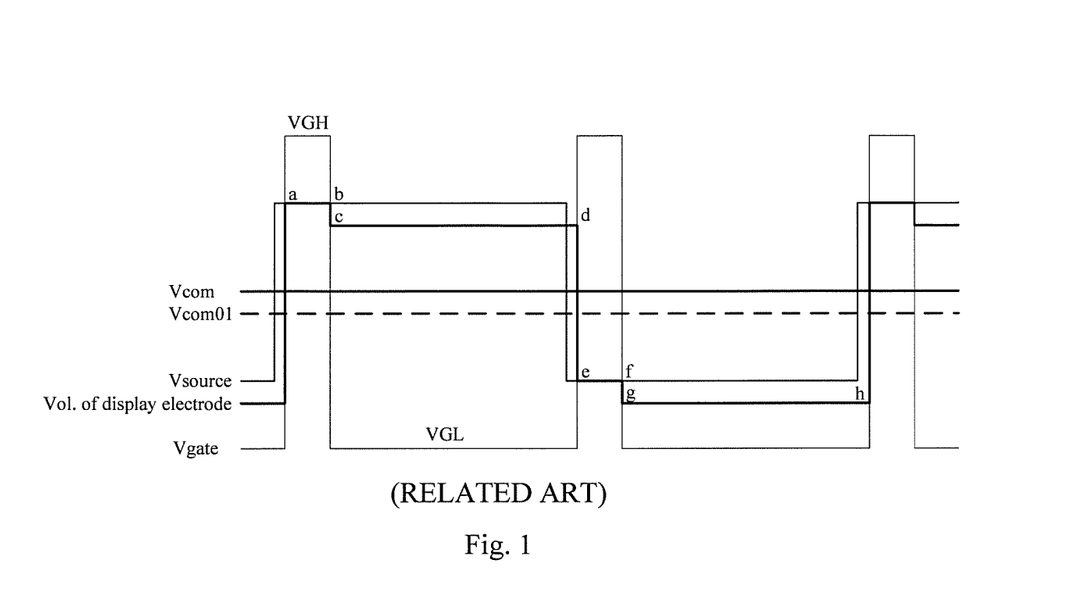
FIG. 1 is a schematic diagram of a common voltage compensation principle in related art.

Reference is made to FIG. 1, which shows a schematic diagram of a common voltage compensation principle in related art. It can be seen from FIG. 1 that a display process of a liquid crystal display panel may be divided into a charging stage and a non-charging stage. The charging stage includes a forward charging stage, the ab section, and a reverse charging stage, the of section. The non-charging stage includes a forward non-charging stage, the cd section, and a reverse non-charging stage, the gh section. Therein, the difference in voltage between the voltage of the display electrode and the voltage of the common electrode is called a display voltage, and by controlling the display voltage, liquid crystal molecules may be driven to deflect, to cause the liquid crystal display to show a different grayscale. In the process of controlling the deflection of liquid crystal molecules, since the liquid crystal molecules have a characteristic that they cannot work too long under a DC voltage, otherwise an electrochemical reaction will take place on the electrode surface of the liquid crystal display panel, causing that the lifespan of the liquid crystal display element is shortened, the liquid crystal display employs an AC driving mode, that is, the above-mentioned display voltage is usually divided into two polarities. When the voltage of the display electrode is higher than the voltage of the common electrode, the display voltage is of a positive polarity, and when the voltage of the display electrode is lower than the common voltage, the display voltage is of a negative polarity. By changing the display voltage to cause the display voltage to continuously alternate between the positive polarity and the negative polarity, the liquid crystal molecules are caused to deflect continuously and it is avoided that the liquid crystal molecules are in an electric field of the same polarity all the time, to prevent the characteristic of the liquid crystal molecules from being destroyed.

In the process of the display voltage continuously alternating, it is necessary to compensate for the common voltage due to the effect of factors such as the parasitic capacitance, etc. If the voltage of the display electrode in the liquid crystal display panel is asymmetric with respect to the common voltage, that is, the absolute values of the display voltages of the two polarities are not the same, it will lead to frequent change of the displayed gray level, causing the liquid crystal display screen to flicker.

In particular, when preparing a thin film transistor (TFT) in a TFT-LCD, a gate insulation layer will be generally formed between the gate and the source of the thin film effect tube, and the gate insulation layer will also form a gate source capacitor Cgs between the gate and the source while it plays the role of insulation between the gate metal and the source metal. The gate source capacitor Cgs is a parasitic capacitor, namely, a capacitor that exists objectively though useless. When the voltage on the scanning line is an ON voltage VGH, that is, the gate voltage Vgate is an ON voltage VGH, a pixel is charged, and at the same time the gate source capacitor Cgs will also be charged. When the voltage on the scanning line is switched from the ON voltage VGH to an OFF voltage VGL, that is, the gate voltage Vgate is switched from the ON voltage VGH to an OFF voltage VGL, the TFT is turned off, the pixel stops being charged, and various capacitors such as the liquid crystal capacitor Clc, the storage capacitor Cst and the gate source capacitor Cgs, etc. redistribute charges. Therein, the gate voltage signal may be a square wave signal, the ON voltage VGH refers to the high level in the square wave signal, and the OFF voltage VGL refers to the low level in the square wave signal. Due to the effect of the gate source capacitor Cgs, the voltage of the display electrode will be pulled low to produce a jump voltage ΔVp, and the numeric value of ΔVp may be calculated by the following formula $$\Delta Vp = Cgs*(VGH-VGL)/(Cgs+Cst+Clc).$$

In this regard, a common voltage regulation circuit disposed in the liquid crystal display panel exists in related art, which provides a common voltage to the liquid crystal display panel and regulates it, and in which is disposed a discharge voltage regulation module. After the liquid crystal display panel is manufactured, the common voltage outputted by the common voltage regulation circuit may be regulated by regulating the discharge voltage regulation module, such that the voltages of the display electrode corresponding to the cd section and the gh section are symmetric with respect to the common voltage. That is, at the non-charging stage, the absolute values of the display voltage of the positive polarity and the display voltage of the negative polarity are equal. For example, as shown in FIG. 1, by adjusting the common voltage Vcom to a corrected common voltage Vcom01, it is avoided that the liquid crystal display panel flickers during the non-charging period of time.

However, in related art, the common electrode traces in the liquid crystal display panel are connected together, and the whole liquid crystal display panel has only one common voltage. Therefore, when compensating for the common voltage, the common voltage may only be adjusted from one value to another value, and such a scheme will cause that the voltages of the ab section and the of section are asymmetric with respect to the common voltage, that is, it cannot eliminate the problem that the display voltages are asymmetric during the charging period of time, causing the display screen to still flicker.

With respect to the above drawbacks, an embodiment of the disclosure provides a common voltage compensation unit.

Figure 2:
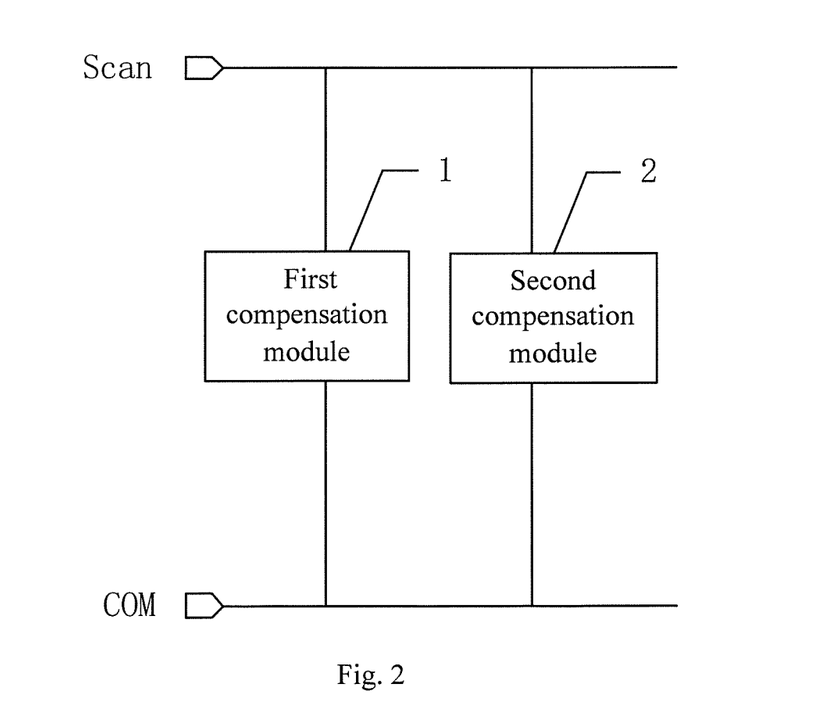
FIG. 2 is a structure diagram of a common voltage compensation unit provided by an embodiment of the disclosure.
Figure 3:
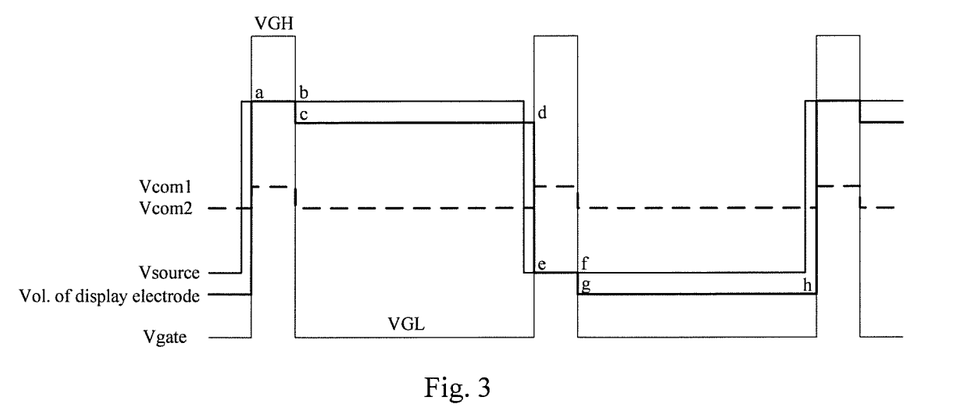
FIG. 3 is a schematic diagram of a common voltage compensation principle provided by an embodiment of the disclosure.

Reference is made to FIG. 2, which shows a structure diagram of a common voltage compensation unit provided by an embodiment of the disclosure. The common voltage compensation unit includes a first compensation module 1, a second compensation module 2, a common electrode line COM and a scanning line Scan. Therein, the first compensation module 1 and the second compensation module 2 are connected in parallel between the common electrode line and the scanning line. Each row scanning line is connected with the gates of individual thin film transistors in a corresponding row of pixels and used for providing a gate voltage Vgate to the gates of the individual thin film transistors. Each row common electrode line is connected with the common electrodes of individual pixels in a corresponding row of pixels and used for providing a common voltage to the individual common electrodes. The common voltage includes a first common voltage Vcom1 and a second common voltage Vcom2. Reference is made to FIG. 3, which shows a schematic diagram of a common voltage compensation principle provided by an embodiment of the disclosure. The display process of the liquid crystal display panel may be divided into a charging stage and a non-charging stage. The charging stage includes a forward charging stage, the ab section, and a reverse charging stage, the ef section. The non-charging stage includes a forward non-charging stage, the cd section, and a reverse non-charging stage, the gh section. Therein, the voltage of the display electrode is formed under the synthetic actions of the source electrode voltage Vsource and the gate voltage Vgate (which both are square wave voltages as shown in the figure), and the difference in voltage between the voltage of the display electrode and the voltage of the common electrode is called a display voltage. The first compensation module 1 is used for outputting the first common voltage Vcom1 to the common electrode line when the voltage on the scanning line is an ON voltage VGH. The second compensation module 2 is used for outputting the second common voltage Vcom2 to the common electrode line when the voltage on the scanning line is an OFF voltage VGL. For example, as shown in FIG. 3, at the charging stage, namely, at the ab section and the ef section, the common voltage of the common voltage compensation unit is Vcom1, and at the non-charging stage, namely, at the cd section and the gh section, the common voltage of the common voltage compensation unit is Vcom2.

Figure 4:
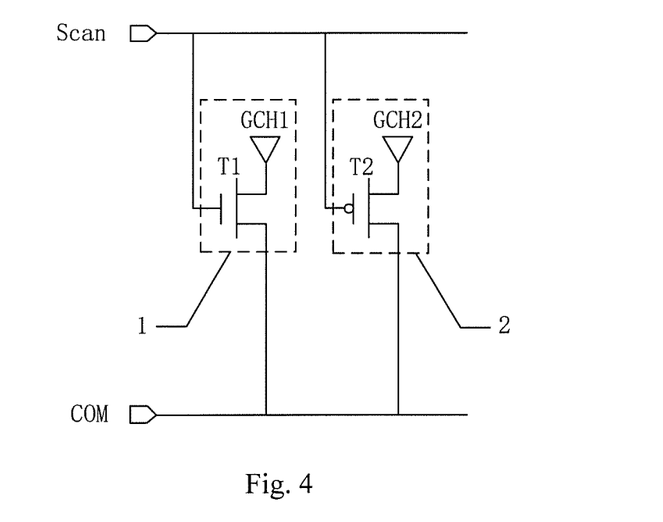
FIG. 4 is a circuit diagram of a common voltage compensation unit provided by an embodiment of the disclosure.

In particular, reference is made to FIG. 4, which shows a circuit diagram of a common voltage compensation unit provided by an embodiment of the disclosure. The structure of the circuit of the embodiment of the disclosure will be described in detail in conjunction with FIG. 4. It needs to be noted that, transistors employed in the embodiments of the disclosure may all be thin film transistors or field effect tubes or other devices with the same characteristics. In the embodiments of the disclosure, the employed transistors are mainly switch transistors, and the switch transistors may be P-type switch transistors, or also may be N-type switch transistors. For example, in an embodiment of the disclosure, a first transistor employs an N-type switch transistor, which is conductive when the gate is at a high level and cut off when the gate is at a low level. A second transistor employs a P-type switch transistor, which is conductive when the gate is at a low level and cut off when the gate is at a high level. In the embodiments of the disclosure, to differentiate between the two poles of a transistor except its gate, the source and the drain thereof are called a first pole and a second pole.

Therein, the first compensation module 1 includes a first input terminal GCH1 and a first transistor T1. The gate of the first transistor T1 is connected with the scanning line, the first pole of the first transistor T1 is connected with the first input terminal GCH1, and the second pole of the first transistor T1 is connected with the common electrode line through a via. The first input terminal GCH1 is used for inputting the first common voltage Vcom1 to the first compensation module 1. The first transistor T1 is used for outputting the first common voltage Vcom1 to the common electrode line when the voltage on the scanning line is the ON voltage VGH.

The second compensation module 2 includes a second input terminal GCH2 and a second transistor T2. The gate of the second transistor T2 is connected with the scanning line, the first pole of the second transistor T2 is connected with the second input terminal GCH2, and the second pole of the second transistor T2 is connected with the common electrode line through a via. The second input terminal GCH2 is used for inputting the second common voltage Vcom2 to the second compensation module 2. The second transistor T2 is used for outputting the second common voltage Vcom2 to the common electrode line when the voltage on the scanning line is the OFF voltage VGL.

It can be seen from the principle of the jump voltage that the display voltage at the charging stage is usually higher than the display voltage at the non-charging stage in a display cycle, that is, the voltage of the display electrode at the ab section is usually higher than the voltage of the display electrode at the cd section, and the voltage of the display electrode at the ef section is usually higher than the voltage of the display electrode at the gh section. Therefore, in general, the first common voltage Vcom1 is greater than the second common voltage Vcom2. For example, if the jump voltage is $\Delta Vp$, generally it may be set such that Vcom1−Vcom2=$\Delta Vp$.

In an actual application, the first transistor T1 and the second transistor T2 are different types of transistors. In particular, the first transistor T1 may be set to be an N-type transistor, and the second transistor T2 may be set to be a P-type transistor, such that when the voltage on the scanning line is the ON voltage VGH, T1 is in an ON state, T2 is in a OFF state, and the voltage on the common electrode line is the first common voltage Vcom1 outputted by T1, and when the voltage on the scanning line is the OFF voltage VGL, T1 is in the OFF state, T2 is in the ON state, and the voltage on the common electrode line is the second common voltage Vcom2 outputted by T2. In turn, by adjusting the first common voltage Vcom1, it may be possible to cause the voltages of the display electrode corresponding to the ab section and the ef section to be symmetric with respect to the common voltage. That is, at the charging stage, it may be possible to cause the absolute values of the display voltage of the positive polarity and the display voltage of the negative polarity to be equal, to avoid the occurrence of the flicker phenomenon at the charging stage. Moreover, by adjusting the second common voltage Vcom2, it may be possible to cause the voltages of the display electrode corresponding to the cd section and the gh section to be symmetric with respect to the common voltage. That is, at the non-charging stage, it may be possible to cause the absolute values of the display voltage of the positive polarity and the display voltage of the negative polarity to be equal, to avoid the occurrence of the flicker phenomenon at the non-charging stage. Thereby, the flicker problem is avoided in the full period, and the picture quality of the display screen of the liquid crystal display panel is effectively improved.

In particular, the first compensation module 1, the second compensation module 2, the common electrode line and the scanning line may all be formed on a thin film transistor array substrate. The first compensation module 1 and the second compensation module 2 are connected with the gate of a thin film transistor in a pixel area in the array substrate through the scanning line, wherein the pixel area includes a source drain metal layer which may be used for forming the source and the drain of a thin film transistor in the pixel area and further for forming the first input terminal GCH1 and the second input terminal GCH2. Since the common electrode line may be formed on one side of the array substrate, the common voltage compensation unit described in the embodiments of the disclosure may be applied in an advanced super dimension switch (ADS) typed TFT-LCD, to facilitate the production of a common electrode layer in the array substrate.

In summary, in the common voltage compensation unit provided by the embodiment of the disclosure, the first compensation module 1 and the second compensation module 2 are connected in parallel between the common electrode line and the scanning line, the first compensation module 1 may be used for outputting a first common voltage Vcom1 to the common electrode line when the voltage on the scanning line is an ON voltage, the second compensation module 2 may be used for outputting a second common voltage Vcom2 to the common electrode line when the voltage on the scanning line is an OFF voltage, and the first common voltage Vcom1 is greater than the second common voltage Vcom2. That is, two common voltages of different intensities are provided by two transistors of different types in a time division manner, and act as the first common voltage Vcom1 in the charging period of time and the second common voltage Vcom2 in the non-charging period of time, respectively, such that the common voltage compensation unit may conduct targeted compensation of different degrees for the common voltage in different periods of time, and whether in the pixel charging period of time or in the non-pixel charging period of time, the positive and negative voltages of the display electrode can be made to be symmetric with respect to the common voltage in a corresponding period, thereby avoiding the flicker problem in the full period and effectively improving the picture quality of the display screen of the liquid crystal display panel.

Figure 5:
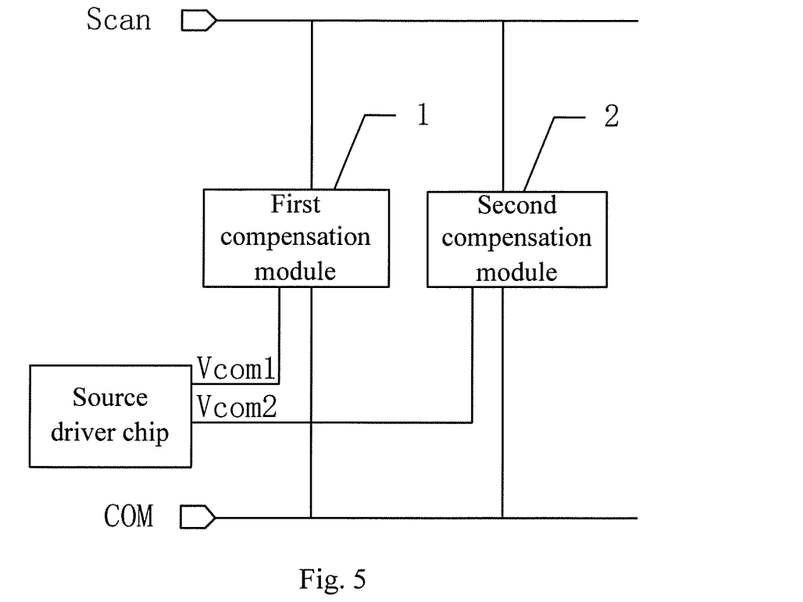
FIG. 5 is a driving circuit containing a common voltage compensation unit provided by an embodiment of the disclosure.

As shown in FIG. 5, when a driving circuit is formed utilizing the above described common voltage compensation unit, the driving circuit further includes a source driver chip. The source driver chip includes a first common voltage Vcom1 output terminal and a second common voltage Vcom2 output terminal. Therein, the first compensation module 1 of each common voltage compensation unit is connected with the first common voltage Vcom1 output terminal. The second compensation module 2 of each common voltage compensation unit is connected with the second common voltage Vcom2 output terminal. The first common voltage Vcom1 output terminal is used for providing the first common voltage Vcom1 to the common voltage compensation unit at an individual level, and the second common voltage Vcom2 output terminal is used for providing the second common voltage Vcom2 to the common voltage compensation unit at an individual level.

Figure 6:
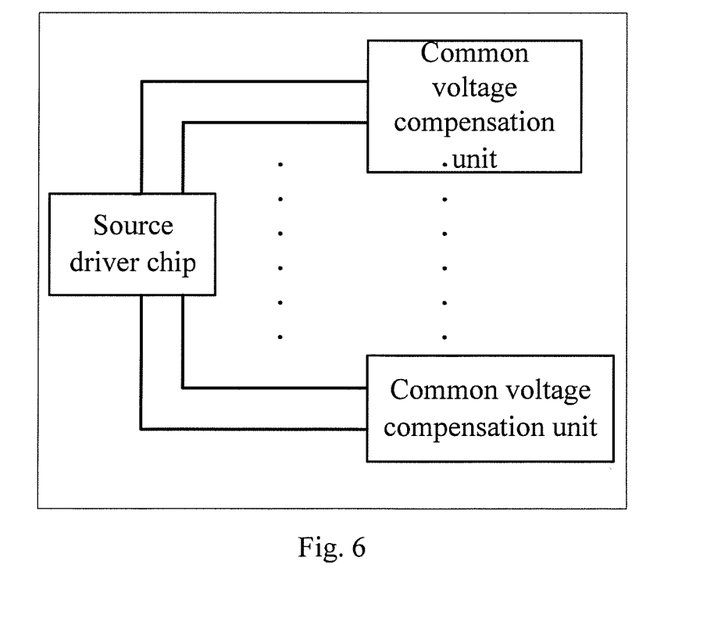
FIG. 6 is a display panel containing a common voltage compensation unit provided by an embodiment of the disclosure.

An embodiment of the disclosure further provides a display panel including a common voltage compensation unit as described above. For each row scanning line, a common electrode line is designed separately to constitute a pair of scanning line and common electrode line, and it corresponds to a common voltage compensation unit. In general, all the effective scanning lines of the display panel correspond to a respective common voltage compensation unit, and generally only correspond to one. Generally, there is disposed only one driving circuit of the display panel. In such a case, according to the disclosure, for the driving circuit, it is required to dispose one common voltage compensation unit for each effective scanning line. In some embodiments, it is not excluded that there are multiple driving circuits of the display panel, and in such a case, for all these driving circuits as a whole, it is ensured that one common voltage compensation unit is disposed for each effective scanning line. The display panel may be any product or component that has the display function such as electronic paper, a mobile phone, a tablet computer, a television, a notebook computer, a digital photo frame, a navigator, etc. The display panel corresponds to any of the above common voltage compensation units, and thereby can solve the same technical problems and achieve the same technical effects.

Figure 7:
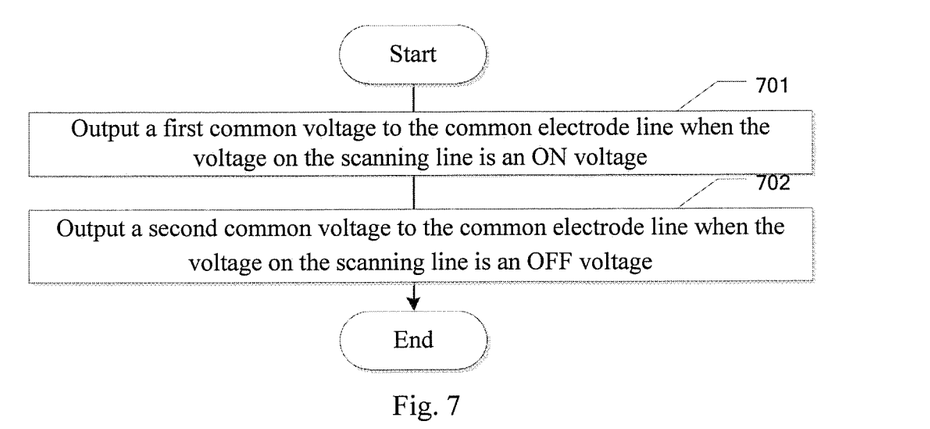
FIG. 7 is a flow chart of a common voltage compensation method provided by an embodiment of the disclosure.

An embodiment of the disclosure further provides a common voltage compensation method 700 for a circuit including a common electrode line and a scanning line, for example, a display panel as described above. As shown in FIG. 7, at step 701, a first common voltage Vcom1 is outputted to the common electrode line when the voltage on the scanning line is an ON voltage; and at step 702, a second common voltage Vcom2 is outputted to the common electrode line when the voltage on the scanning line is an OFF voltage, wherein the first common voltage Vcom1 is greater than the second common voltage Vcom2.

The common voltage compensation method may be implemented by any of the above common voltage compensation units. For example, when the voltage on the scanning line is the ON voltage, the first common voltage Vcom1 is outputted to the common electrode line by the first compensation module 1. When the voltage on the scanning line is the OFF voltage, the second common voltage Vcom2 is outputted to the common electrode line by the second compensation module 2. Likewise, the common voltage compensation method may solve the same technical problems and achieve the same technical effects as the common voltage compensation unit, which will not be repeated here any longer.

The individual embodiments in the specification are described in a progressive manner, each embodiment highlights its difference from other embodiments, and identical or similar parts of the individual embodiments may be referred relative to each other.

In the above, a common voltage compensation unit and compensation method, a driving circuit and a display panel provided by the disclosure have been introduced in detail. In this context, the principles and implementations of the disclosure have been elucidated utilizing specific examples, and the illustration of the above embodiments is only used for helping understand the method of the disclosure and its core ideas. Meanwhile, for the person having ordinary skills in the art, there will be changes in the specific implementations and the disclosure scope according to the ideas of the disclosure. In summary, the content of the specification should not be understood to be limiting to the disclosure.

What is claimed is:

1. A common voltage compensation unit for a scanning line, comprising:
  a first compensation module,
  a second compensation module,
  the scanning line, and
  a common electrode line corresponding to the scanning line one-to-one;
  wherein the first compensation module and the second compensation module are connected in parallel between the common electrode line and the scanning line;
  wherein the first compensation module is used for outputting a first common voltage to the common electrode line when the voltage on the scanning line is an ON voltage; and
  wherein the second compensation module is used for outputting a second common voltage to the common electrode line when the voltage on the scanning line is an OFF voltage; and
  wherein the first common voltage is greater than the second common voltage;
  wherein:
    the first compensation module comprises a first input terminal and a first transistor;
    a gate of the first transistor is connected with the scanning line, a first pole of the first transistor is connected with the first input terminal, and a second pole of the first transistor is connected with the common electrode line;
    the first input terminal is used for inputting the first common voltage to the first compensation module; and
    the first transistor is used for conducting the first common voltage to the common electrode line when the voltage on the scanning line is the ON voltage;
  and wherein:
    the second compensation module comprises a second input terminal and a second transistor;
    a gate of the second transistor is connected with the scanning line, a first pole of the second transistor is connected with the second input terminal, and a second pole of the second transistor is connected with the common electrode line;
    the second input terminal is used for inputting the second common voltage to the second compensation module; and
    the second transistor is used for conducting the second common voltage to the common electrode line when the voltage on the scanning line is the OFF voltage;
  wherein the first transistor is an N-type transistor, and the second transistor is a P-type transistor.

2. The common voltage compensation unit as claimed in claim 1, wherein the first compensation module, the second compensation module, the common electrode line and the scanning line are all formed on a thin film transistor array substrate.

3. The common voltage compensation unit as claimed in claim 2, wherein
  the first compensation module and the second compensation module are connected with a gate of a thin film transistor in a pixel area in the array substrate through the scanning line, wherein the pixel area comprises a source drain metal layer which is used for forming the source and the drain of a thin film transistor in the pixel area and further for forming the first input terminal and the second input terminal.

4. A driving circuit comprising at least one common voltage compensation unit as claimed in claim 1, the driving circuit further comprising a source driver chip;
  wherein the source driver chip comprises a first common voltage output terminal and a second common voltage output terminal;
  wherein the first compensation module of each common voltage compensation unit is connected with the first common voltage output terminal to receive a first common voltage therefrom; and
  wherein the second compensation module of each common voltage compensation unit is connected with the second common voltage output terminal to receive a second common voltage therefrom.

5. The driving circuit as claimed in claim 4, wherein:
  the first compensation module comprises a first input terminal and a first transistor;
  a gate of the first transistor is connected with the scanning line, a first pole of the first transistor is connected with the first input terminal, and a second pole of the first transistor is connected with the common electrode line;
  the first input terminal is used for inputting the first common voltage to the first compensation module; and the first transistor is used for conducting the first common voltage to the common electrode line when the voltage on the scanning line is the ON voltage.

6. The driving circuit as claimed in claim 5, wherein:
the second compensation module comprises a second input terminal and a second transistor;
a gate of the second transistor is connected with the scanning line, a first pole of the second transistor is connected with the second input terminal, and a second pole of the second transistor is connected with the common electrode line;
the second input terminal is used for inputting the second common voltage to the second compensation module; and
the second transistor is used for conducting the second common voltage to the common electrode line when the voltage on the scanning line is the OFF voltage.

7. The driving circuit as claimed in claim 6, wherein the first transistor is an N-type transistor, and the second transistor is a P-type transistor.

8. The driving circuit as claimed in claim 7, wherein the first compensation module and the second compensation module are connected with a gate of a thin film transistor in a pixel area in an array substrate through the scanning line, wherein the pixel area comprises a source drain metal layer which is used for forming the source and the drain of a thin film transistor in the pixel area and further for forming the first input terminal and the second input terminal.

9. A display panel comprising a common voltage compensation unit as claimed in claim 1.

10. The display panel as claimed in claim 9, wherein each of all the scanning lines of the display panel correspond to a respective common voltage compensation unit.

11. The display panel as claimed in claim 9, wherein:
the first compensation module comprises a first input terminal and a first transistor;
a gate of the first transistor is connected with the scanning line, a first pole of the first transistor is connected with the first input terminal, and a second pole of the first transistor is connected with the common electrode line, wherein:
the first input terminal is used for inputting the first common voltage to the first compensation module;
the first transistor is used for conducting the first common voltage to the common electrode line when the voltage on the scanning line is the ON voltage; and
the second compensation module comprises a second input terminal and a second transistor;
a gate of the second transistor is connected with the scanning line, a first pole of the second transistor is connected with the second input terminal, and a second pole of the second transistor is connected with the common electrode line, wherein:
the second input terminal is used for inputting the second common voltage to the second compensation module;
the second transistor is used for conducting the second common voltage to the common electrode line when the voltage on the scanning line is the OFF voltage.

* * * * *